Sept. 9, 1930.  R. S. BARTLETT ET AL  1,775,481
INCUBATOR
Filed Dec. 14, 1927  3 Sheets-Sheet 1

Inventors
R. S. Bartlett,
C. D. Harrison,
P. D. Lindsey,
By J. Stanley Buch
Attorney Sept. 9, 1930. R. S. BARTLETT ET AL 1,775,481
INCUBATOR
Filed Dec. 14, 1927 3 Sheets-Sheet 2
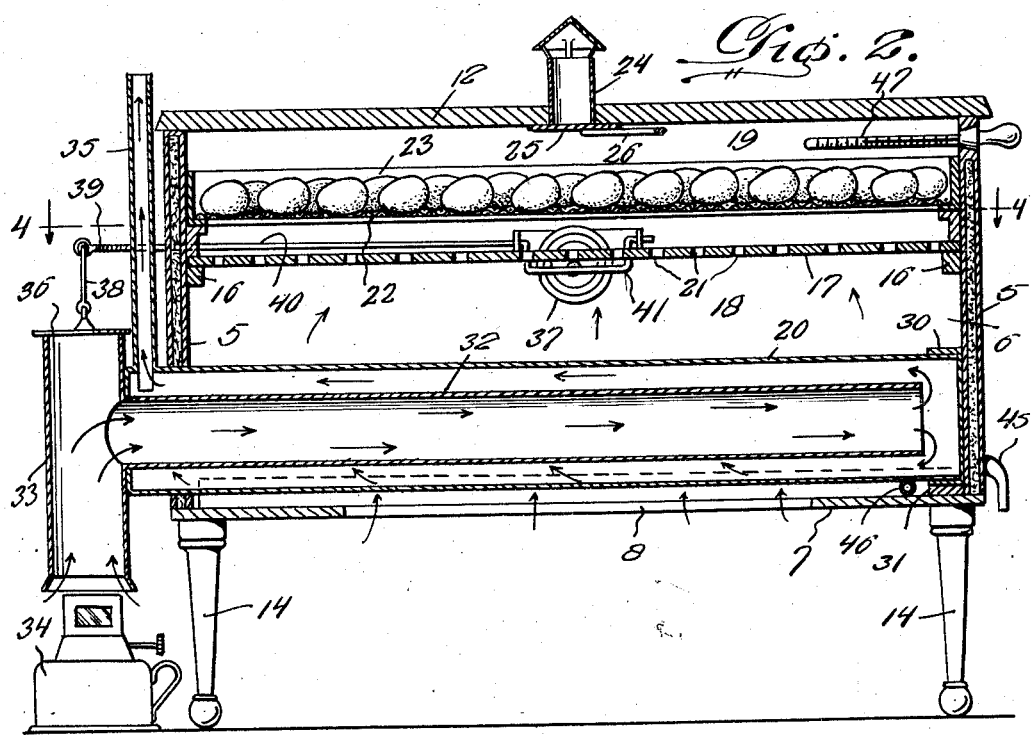
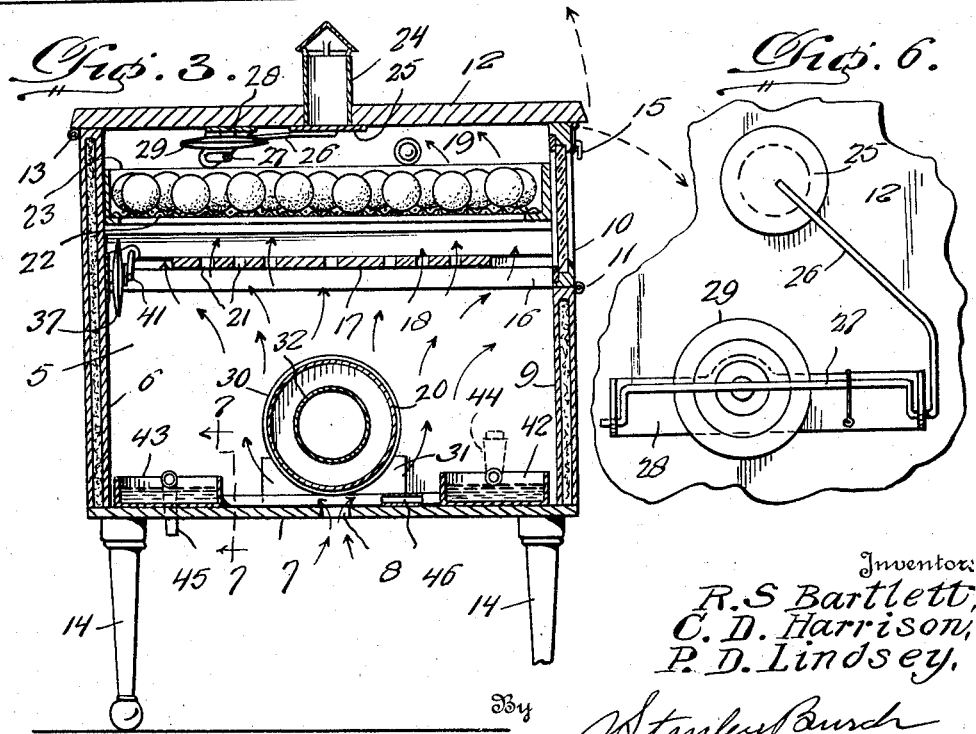
Inventors:
R. S. Bartlett,
C. D. Harrison,
P. D. Lindsey.
By J. Stanley Burch
Attorney

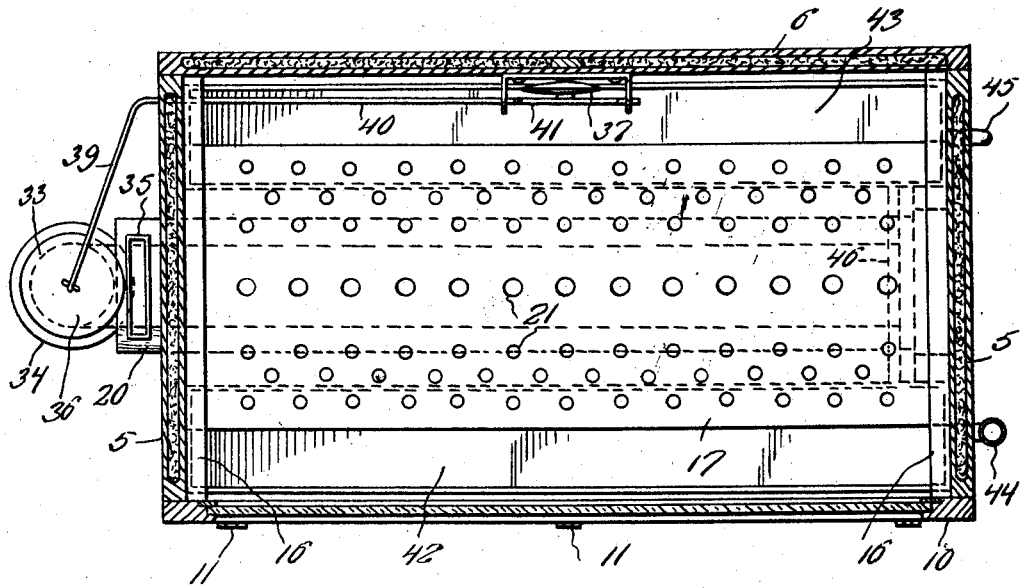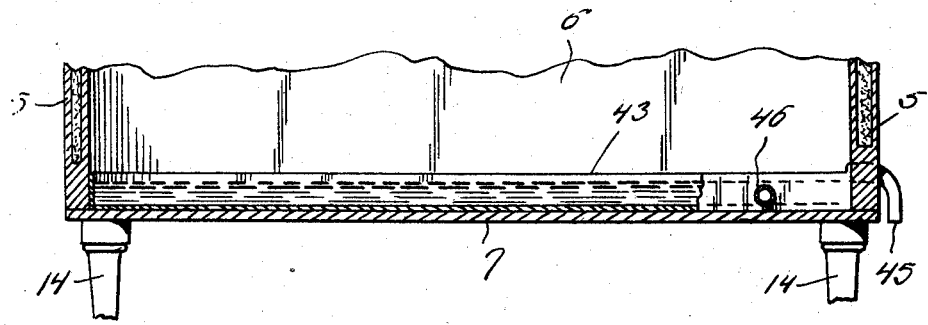

Patented Sept. 9, 1930

1,775,481

UNITED STATES PATENT OFFICE

ROBERT S. BARTLETT, CHARLES D. HARRISON, AND PARREN D. LINDSEY, OF HOMINY, OKLAHOMA

INCUBATOR

Application filed December 14, 1927. Serial No. 239,977.

An object of the present invention is to provide an improved construction of incubator in which special provision is made for effecting and automatically maintaining an even and uniform temperature in the incubator body and a corresponding application of heat to the eggs supported in the egg tray or drawer.

Another object is to provide an improved incubator embodying a new and improved form and arrangement of egg tray, heating means, and ventilating means so as to insure uniform distribution of hot air in the insulating chamber and a like flow of the hot air through the tray and past the eggs to uniformly heat the latter.

Still other objects are to provide for convenient access to the egg tray and other parts within the incubator body for facilitating their assembly or their removal for attention, cleaning or repair, and to provide a construction which is of generally simplified and improved form.

The invention consists in the novel form, combination and arrangement of parts hereinafter more fully described, shown in the accompanying drawings and claimed.

In the drawings:

Figure 2 is a central vertical longitudinal section thereof.

Figure 3 is a central vertical transverse section of the same.

Figure 4 is a horizontal section on line 4—4 of Figure 2.

Figure 6 is a fragmentary bottom plan view showing the thermostatically operated damper for controlling the outflow of hot air from the incubator body; and Figure 7 is a fragmentary vertical longitudinal section on line 7—7 of Figure 3.

Figure 1:
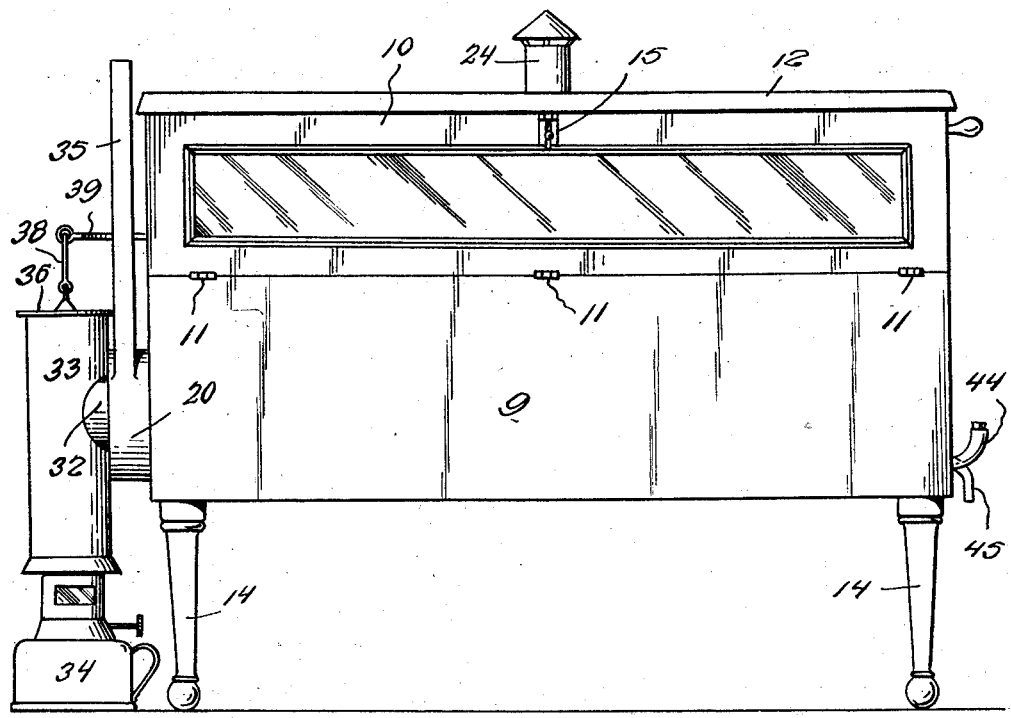
Figure 1 is a front elevational view of an incubator embodying the present invention.

Referring more in detail to the drawings, the incubator includes a horizontally elongated box-like body having side walls 5, a back wall 6, a bottom wall 7 having a central longitudinally extending elongated cold air inlet opening or slot 8, a front wall 9 having an upper section 10 provided with a window and hinged, as at 11, to swing outwardly and downwardly to open position, and a top wall or lid 12 hinged, as at 13, to swing upwardly and rearwardly to open position. The incubator body is supported at the desired elevation by corner legs 14, and suitable means is provided, as at 15 to connect the adjacent free ends of the front wall section 10 and lid 12 to releasably hold them closed.

Removably mounted in horizontal guides 16 carried by the end walls 5 is a slide 17 forming a hot air deflecting plate and dividing the interior of the incubator body into a lower heating chamber 18 and an upper incubating chamber 19, the slide 17 being mounted so as to be removable through the lower part of the opening formed in the front of the incubator body when the front wall section 10 is opened. A heating drum 20 extends laterally and in the lower part of the heating chamber 18 directly over the cold air inlet slot 8 and from side to side of the incubator body beneath the deflector 17. The deflector 17 is of a depth less than that of the incubator body and may be adjusted to any desired position between the front and back walls of the incubator body to secure the required distribution of hot air under various conditions. The deflector 17 is preferably provided with numerous perforations 21 substantially throughout its area so that a portion of the hot air may pass therethrough directly to and through various portions of the foraminous or perforated bottom 22 of a removable egg drawer or tray 23 which is slidably mounted in the incubating chamber 19 so as to be removable through the front of the incubator body when the front wall section 10 is opened.

Figure 5:
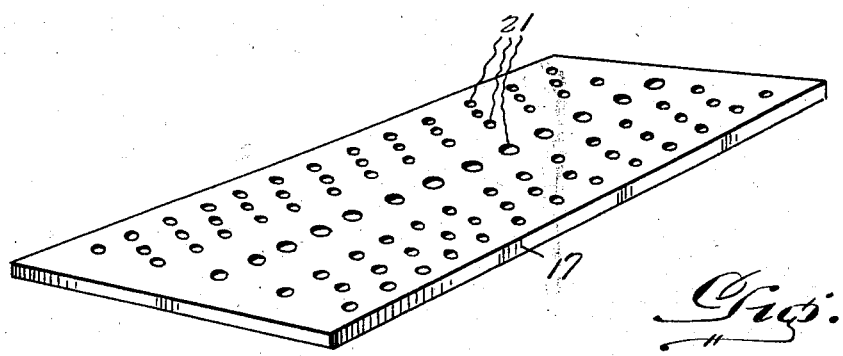
Figure 5 is a perspective view of the hot air deflector.

It will be seen that the cold air entering the slot 8 will pass upwardly about the opposite sides of the drum 20 and thereby become heated effectively and uniformly, the heated air then passing through and past the front and rear edges of the deflector 17 to and through the entire bottom of the egg tray so as to uniformly heat all of the eggs in the tray, the hot air finally passing out of the top of the incubating chamber through the ventilator 24 provided centrally in the top wall or lid 12. A most efficient hot air distribution can be had by providing the deflector 17 with a single central row of relatively large openings and numerous openings of smaller size at each side of this row as shown clearly in Figures 4 and 5.

A spring-seated damper 25, adapted to seat upwardly for normally closing the bottom of the ventilator 24, is provided within the incubating chamber and carried by an arm 26 provided on one end of a crank 27 journaled in a bracket 28 attached to the under side of the lid 12. The crank 27 is operatively associated with a thermostat 29 so that the damper 25 is opened when said thermostat expands due to the heat of the air rising to a predetermined temperature in the incubating chamber. In this way, the ventilator is only closed when the heat is below that normal for incubating purposes, such as when starting the incubator in operation, and under ordinary operating conditions the damper 25 will be open to allow the circulation of air through the incubator body as described above. The damper 25 will, of course, open a distance corresponding to any increase of temperature above the predetermined temperature mentioned, to thereby have a heat regulating action.

As shown, the heating drum 20 extends through an opening in one side wall 5 and has its inner end closed by a removable cap 30 and supported in a saddle 31 mounted on the bottom wall 7 at the inner side of the other side wall 5. The projecting end of the drum 20 has an axial opening through which projects a lateral branch 32 of a chimney 33 beneath which is arranged a burner 34. The branch 32 is disposed in spaced concentric relation to the drum 20 and extends to a point adjacent the inner end of the latter, while the projecting end of the drum has an upstanding stack 35. A damper 36, operatively connected to a thermostat 37 arranged within the back part of the incubator body above the drum 20, controls the escape of waste heat through the upper end of the chimney 33, and such heated products of combustion and hot air as are not allowed to escape through the top of the chimney are diverted through the branch 32 for the full length of the drum 20 where they pass out of said branch and return through the drum for the full length of the latter again before passing out of the stack 35. In this way, maximum heating efficiency is insured, and the temperature to which the drum is heated will be in direct proportion to the degree of heat in the top of the heating chamber 18 due to the location of thermostat 37 and its connection to damper 36 for opening the latter more and more as the temperature in said heating chamber rises above a predetermined point. The damper 36 is suspended by a link 38 from a crank arm 39 provided on one end of a shaft 40 journaled in the incubator body and formed with a crank 41 which engages and is actuated by the thermostat 37.

Mounted on the bottom wall 7, at opposite sides of the heating drum 20 are water pans 42 and 43, respectively provided with filler and overflow pipes 44 and 45 and placed in communication with each other by a pipe 46, so that the water will maintain the same level in both pans at all times for insuring uniform moistening of the hot air, and so as to effect filling of both pans through the one filler pipe without danger of the water overflowing within the incubator body. A removable thermometer 47 is mounted in the end wall 5 opposite that at which the chimney 33 and burner 34 are located, said thermometer projecting into the incubating chamber when in place and being removable for purposes of testing the heating appartus to insure that it is working properly.

As the incubator is used in a general manner well known in the art, it is believed the construction and operation will be readily understood without further detailed descripton.

Minor changes may be made without departing from the spirit and scope of the invention as claimed.

What we claim is:

In an incubator, an incubator body having a top wall provided with a hot air outlet and a bottom wall provided with a central longitudinal elongated cold air inlet, a hot air deflector plate dividing the body into a lower heating chamber and an upper incubating chamber, heating means including a horizontal heating drum extending longitudinally of heating chamber directly above said cold air inlet, and an egg tray in the incubating chamber having a foraminous bottom, and water pans mounted on the bottom of the body at opposite sides of said heating drum, means placing said water pans in communication with each other, a filler pipe for one of said pans, and an overflow pipe for the other pan.

In testimony whereof we affix our signatures.

ROBERT S. BARTLETT.
CHARLES D. HARRISON.
PARREN D. LINDSEY.